(12) United States Patent
Garcia-Luna-Aceves et al.

(10) Patent No.: US 7,046,639 B2
(45) Date of Patent: *May 16, 2006

(54) SYSTEM AND METHOD FOR AD HOC NETWORK ACCESS EMPLOYING THE DISTRIBUTED ELECTION OF A SHARED TRANSMISSION SCHEDULE

(75) Inventors: J. J. Garcia-Luna-Aceves, San Mateo, CA (US); Lichun Bao, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 928 days.

This patent is subject to a terminal disclaimer.

(21) Appl. No.: 09/967,901

(22) Filed: Sep. 28, 2001

(65) Prior Publication Data

US 2002/0067736 A1  Jun. 6, 2002

Related U.S. Application Data

(60) Provisional application No. 60/237,017, filed on Sep. 29, 2000.

(51) Int. Cl.
  *H04Q 7/00* (2006.01)
(52) U.S. Cl. ...................... 370/314; 370/445
(58) Field of Classification Search ............ 370/314, 370/445, 235, 258, 310.2, 321, 322, 326, 370/328, 329, 336, 338, 341, 347, 348, 395.4, 370/449, 450, 458, 468, 515
See application file for complete search history.

(56) References Cited

U.S. PATENT DOCUMENTS

| | | | | |
|---|---|---|---|---|
| 4,774,707 A | * | 9/1988 | Raychaudhuri | 370/447 |
| 5,682,382 A | * | 10/1997 | Shepard | 370/342 |
| 6,744,743 B1 | * | 6/2004 | Walton et al. | 370/318 |

OTHER PUBLICATIONS

Chlamta, Imrich and Farago, Andras; "Making Transmission Schedules Immune to Topology Changes in Multi-Hop Packet Radio Networks," IEEE/ACM Transactions on Networking, vol. 2, No. 1, pp. 23-29, Feb., 1994.

(Continued)

*Primary Examiner*—Wellington Chin
*Assistant Examiner*—Brenda Pham
(74) *Attorney, Agent, or Firm*—John P. O'Banion

(57) ABSTRACT

A system and method of providing distributed election of a shared transmission schedule within an ad hoc network. The invention includes a collision-free access protocol which resolves channel access contentions for time division multiple access (TDMA) of a single channel. Time-slots are organized into part numbers, which are included within sections, a sequence of which define a block. Each node is given a ring number according to its location within the network topology and maintains local neighbor information along with its own part number and message digest. Collision-free channel access is automatically scheduled and repetitious contention phases are resolved by a random permutation algorithm operating in message digests. An empty time-slot utilization method is also described and data packets may also be transmitted subject to a non-zero collision probability within a blind section of the block.

40 Claims, 11 Drawing Sheets

OTHER PUBLICATIONS

Cidon, Israel and Sidi, Moshe; "Distributed Assignment Algorithms for Multi-Hop Packet-Radio Networks," IEEE Transactions on Computers, vol. 38, No. 10, pp. 1353-1361, Oct., 1989.

Ephremides, Anthony and Truong, Thuan V.; "Scheduling Broadcasts in Multihop Radio Networks," IEEE Transactions on Communications, vol. 38, No. 4, pp. 456-460, Apr., 1990.

Ji-Her Ju and V.O.K. Li; "An Optimal Topology-Transparent Scheduling Method in Multihop Packet Radio Networks," IEEE/ACM Transactions on Networking, vol. 6, No. 3, pp. 298-306, Jun., 1998.

Ji-Her Ju and V.O.K. Li; "TDMA Scheduling Design of Multihop Packet Radio Networks Based on Latin Squares," IEEE Journal of Selected Areas in Communications, vol. 17, No. 8, pp. 1345-1352, Aug., 1999.

Lamport, Leslie; "Time, Clocks, and the Ordering of Events in a Distributed System," Communications of the ACM, vol. 21, No. 7, pp. 558-565, Jul., 1978.

Pond, Lawrence C. and V.O.K. Li; "A Distributed Time-Slot Assignment Protocol for Mobile Multi-Hop Broadcast Packet Radio Networks," Milcom 89, vol. 1, pp. 70-74, Boston, MA, (1989).

Ramaswami, R. and Parhi, K.K.; "Distributed Scheduling of Broadcasts in a Radio Network," IEEE Infocom '89, The Conference on Computer Communications, Proceedings of the 8th Annual Joint Conference of the IEEE Computer and Communications Societies, vol. 2, pp. 497-504, Apr., 1989.

Rivest, R.L.; "The MD4 Message-Digest Algorithm," Network Working Group, Request for Comments Number 1320, Advances in Cryptology—Crypto '90 Proceedings, pp. 303-311, Santa Barbara, CA, Aug. 11-15, 1991.

Tang, Zhenyu and Garcia-Luna-Aceves, J.J.; "A Protocol for Topology-Dependent Transmission Scheduling in Wireless Networks," Proceedings IEEE Wireless Communications and Networking Conference, pp. 1-5, (WCNC 99), New Orleans, LA, Sep. 21-24, 1999.

Touch, J.D.; "Performance Analysis of MD5," Computer Communication Review, vol. 25, pp. 77-86, ACM, Oct., 1995.

Zhu, Chenxi and Corson, M. Scott,"A Five-Phase Reservation Protocol (FPRP) for Mobile Ad Hoc Networks," IEEE Infocom '98, vol. 1, pp. 322-331, San Francisco, CA, Mar. 29 thru Apr. 2, 1998.

Tobagi, Fouad A. and Kleinrock, Leonard; "Packet Switching in Radio Channels: Part II—The Hidden Terminal Problem in Carrier Sense Multiple-Access and the Busy-Tone Solution," IEEE Transactions on Communications, vol. 23, No. 12, pp. 1417-1433, Dec., 1975.

Larsen, Richard J. and Marx, Morris L.; "An Introduction to Probability and its Applications," ISBN 0134934539, pp. 165-167, Englewood Cliffs, N.J., Prentice-Hall, (1985).

Feller, William; "An Introduction to Probability Theory and its Applications," vol. 1, Second Edition, pp. 58-60, New York, New York, John Wiley, (1957).

* cited by examiner

SYSTEM AND METHOD FOR AD HOC NETWORK ACCESS EMPLOYING THE DISTRIBUTED ELECTION OF A SHARED TRANSMISSION SCHEDULE

CROSS-REFERENCE TO RELATED APPLICATIONS

This application claims priority from U.S. provisional application Ser. No. 60/237,017 filed on Sep. 29, 2000, incorporated herein by reference.

STATEMENT REGARDING FEDERALLY SPONSORED RESEARCH OR DEVELOPMENT

This invention was made with Government support under Grant No. F30602-97-2-0338, awarded by the Air Force Office of Scientific Research (AFOSR). The Government has certain rights in this invention.

BACKGROUND OF THE INVENTION

1. Field of the Invention

The present invention pertains generally to ad hoc networking, and more particularly to a method and system of medium access control (MAC) to provide collision-free access within the ad hoc network.

2. Description of the Background Art

A number of scheduling methods exist for controlling time division multiple access (TDMA) to achieve collision-free transmissions of data frames within time-slots of a single communication channel in a multi-hop packet radio network. These methods generally require that each node in the network utilize a certain amount of bandwidth to resolve contentions for a given time-slot before transmissions on that time-slot.

It has been shown that the problem of scheduling optimal time division multiplexing (TDM) for broadcasting channel access in multi-hop packet radio networks is an NP-complete problem even when global topology knowledge is made available to all nodes within the network. Distributed algorithms, therefore, have been proposed that eliminate direct packet interference, also referred to as primary conflict, and hidden terminal interference, also referred to as secondary conflict, within the transmission segment of the channel by splitting out a second contention-based control segment from the channel for out-band signaling of time-slot allocation information. However, it will be appreciated that the technique suffers from a considerable amount of overhead due to the use of a control segment. Several channel scheduling and reservation methods (protocols) have been proposed which are based on in-band signaling, such as phased dialogs or RTS/CTS handshakes, which occur before packet transmission. The limiting factor within this class of scheduling protocols is that they spend a portion of the channel for channel contention, and such contention may result in unused time-slots, as a result of unresolved contentions.

A number of topology-transparent scheduling methods have been proposed which conceptually allow a node to transmit in a number of time-slots in each frame. The allowed transmission times are given as time-slots within the given block. When a node i transmits in a frame corresponding to a unique code such that, for any given neighbor k of i, node i has at least one transmission slot during which k and none of k's own neighbors are transmitting. Therefore, within any given framing time, any neighbor of node i can receive at least one collision-free packet from i. Substantial limitations have hindered these previous topology-independent scheduling approaches, such as: (a) the sender of the packet is responsible to recognize which neighbor, or neighbors, are able to correctly receive the packet in a given slot. This requirement implies that the sender needs to transmit the packet in the various slots it has available in a frame, and (b) the frame length, given by a number of slots, must be larger than the number of nodes in a two-hop neighborhood and it depends on the network size, which is less scalable. It will be appreciated that these protocols are subject to similar limitations in that they either compete with two-hop neighbors for collision-free channel access or allow collisions to occur and then amend with repetitions.

Therefore, a need exists for a method and system that allows collision-free channel access within an ad hoc network while maximizing the use of the available channel bandwidth. The present invention satisfies those needs, as well as others, and overcomes the deficiencies of previously developed medium access control protocols.

BRIEF SUMMARY OF THE INVENTION

The present invention generally pertains to a system and method for controlling ad hoc network access by employing distributed election of a shared transmission schedule. By way of example, and not of limitation, the invention includes a new protocol that is a collision-free medium access control (MAC) protocol that resolves contentions for time division multiple access (TDMA) for a single communication channel. The contention-resolution algorithm assumes a synchronized function generating random-permutation of contending parties for collision-free transmissions, which implies a knowledge of the two-hop neighborhood in the network topology by each node. The permutation corresponds to the array of sorted message digests of all contending parties. Each message digest comprises a fingerprint of each contending party identification (ID) and a seed, plus the contending party ID. The seed is synchronized at all parties and regenerates itself by a common random function from time to time so that the message digest of each party varies every time to assure the randomness of the permutation. Once a party finds itself at the first position of the sorted sequence, the party is authorized to access the common channel. For others that find themselves at other positions, they remain quiet for the time-slot. There is no collision because the permutation involves two-hop neighbors at each node and the partial order of every pair of nodes are the same at all nodes.

To bound the upper limit of the interval between successive transmissions, the present invention preferably supports a "blind section" within the block. Data frame transmissions within the blind section are subject to a non-zero probability of collision.

Competition for empty time-slots, not otherwise allocated, is supported within the present invention to increase bandwidth utilization. A random-permutation algorithm is again utilized to order the message digests and determine a winner which gains access to the channel.

An object of the invention is to provide collision-free channel access within ad hoc networks.

Another object of the invention is to provide priority based channel accesses rather than impromptu handshakes or contention phases before transmitting data frames as occur in a number of TDMA protocols.

Another object the invention is to schedule channel use according to a method which can randomly allocate channel use, wherein every contending party gains equal access to the channel.

Another object of the invention is to control the liveliness of the protocol according to the permutation.

Another object of the invention is to allow at least one party to prevail in acquiring the time-slot for transmission, without the wasted time-slots found in other contention-based TDMA protocols.

Another object of the invention is to eliminate collisions within negotiations that lead to channel access.

Another object of the invention is to provide predictable channel access in response to computation-oriented scheduling.

Another object of the invention is to increase the control of traffic scheduling through nodes according to type and service request.

Another object of the invention is to provide organization of time-slots so as to allow fixed part number assignment and dynamic time-slot assignment.

Another object of the invention is to control contention density and collisions between nodes, wherein each node is accorded a part number and time-slot for transmission.

Another object of the invention is to provide bandwidth reservation capability that provides more control over the share of channel that a node could request and use for transmissions.

Another object of the invention is to provide a contention resolution mechanism that provides equitable transmission allocation for all nodes.

BRIEF DESCRIPTION OF THE DRAWINGS

The invention will be more fully understood by reference to the following drawings which are for illustrative purposes only.

DESCRIPTION OF THE INVENTION

Figure 1:
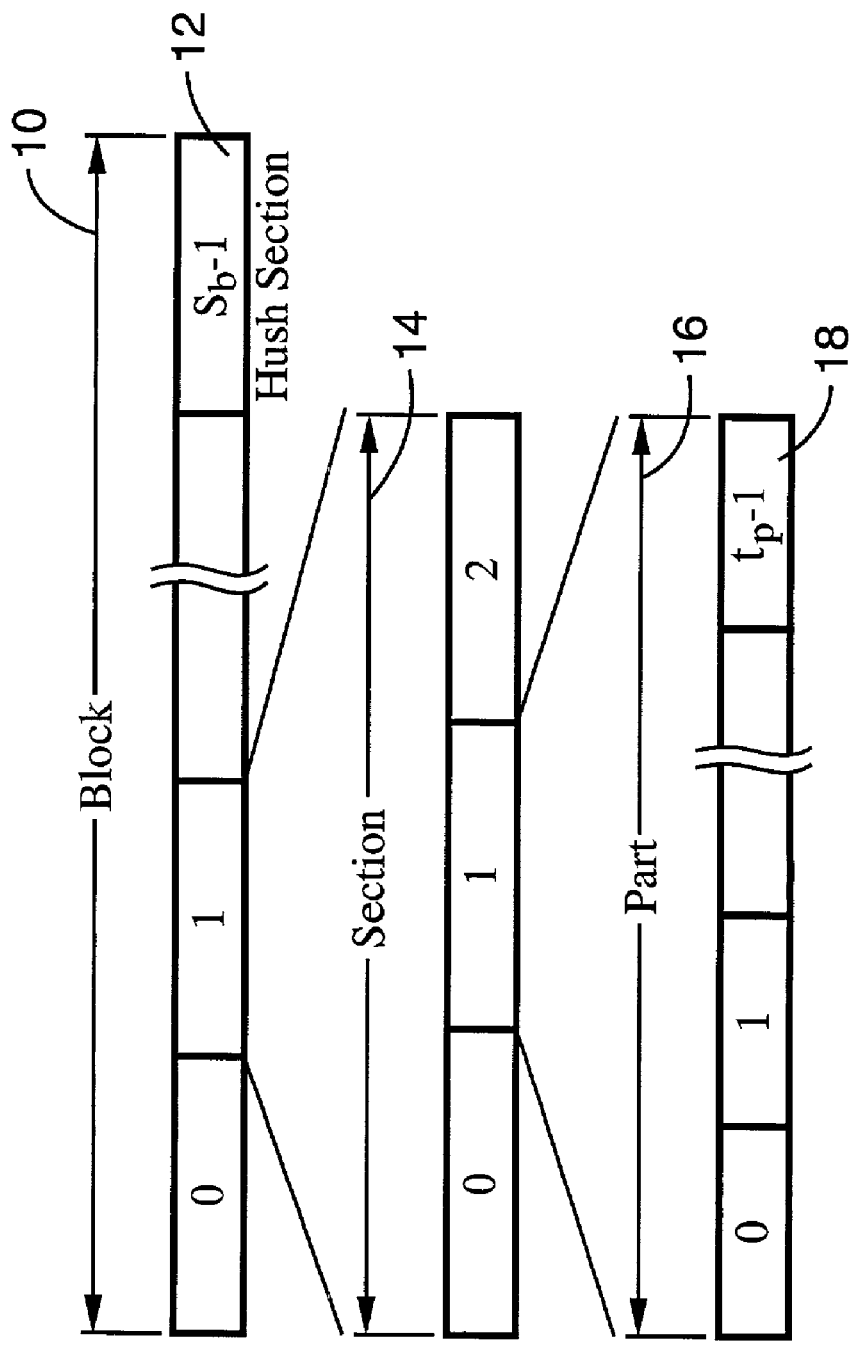
FIG. 1 is a block diagram of a TDMA block according to an aspect of the present invention showing sections, parts, and time-slot hierarchy within the block.

Referring more specifically to the drawings, for illustrative purposes the present invention is embodied in the apparatus generally shown in FIG. 1 through FIG. 14. It will be appreciated that the apparatus may vary as to configuration and as to details of the parts, and that the method may vary as to the specific steps and sequence, without departing from the basic concepts as disclosed herein.

1. Introduction

A topology-dependent TDMA method and system that automatically schedules collision-free channel access at each node without requiring repetitious contention phase(s) when a node requires channel access. One of the requirements for the present method is that each node obtain, or maintain, topology information regarding local neighbors, such as those neighbors within a two-hop distance. It will be appreciated that one-hop neighbors comprise neighbors joined by a single link while two-hop neighbors have a common one-hop neighbor. Channel bandwidth is substantially devoted to communicating data packets except for the occasional synchronization and neighbor status updates. Unique qualitative features of the protocol are illustrated and simulation of the performance are analyzed quantitatively. The computational nature of the method assures flexible channel scheduling and can provide assured quality of service (QOS) levels on the network.

Scheduled access to a common channel in multi-hop packet radio networks has received considerable attention recently. This scheduled-access approach, which also may be referred to as transmission scheduling, node/link activation, allocation, or scheduling, consists of establishing transmission schedules to eliminate collisions while attempting to maximize the efficient use of the available bandwidth. For example, stations may be allocated to transmit at differing times and/or different data channels. It will be appreciated that the data channels may be separated in a number of ways, such as by frequency, spreading codes, and the like. Efficient scheduling with channel reuse can render higher levels of channel utilization than can be provided with fixed assignment approaches such as TDMA and FDMA.

The present invention allows a node within a network to broadcast packets to its neighbors without interference from other packet. The problem of scheduling collision-free broadcasts, also referred to as node activation, has been formulated in such a way that only one node is assigned to a time-slot within its two-hop neighborhood. A hierarchy of non-repeating contiguous data structures is defined within each block, wherein a series of time-slots are organized into parts, that are fit into sections, a collection of which comprise the block. Each of the section within a given block can be subject to different time-slot allocation rules, and be configured with different segments within the time-slot to contain alternate parameters. For example, the hush section within each block as described herein provides time-slots to allow new members to join the network. Each time-slot may be further divided into segments, such as for use with specific sections of a block.

A new topology-dependent transmission scheduling solution is described which is herein referred to as time wave multiple access (TWMA), that allows a time-slot to be shared by two-hop neighbors without conflict and without time-consuming contention phases prior to gaining access of a time-slot. The use of TWMA requires that a node have information about local neighbors, such as those within a two-hop distance from the given node. It will be appreciated, however, that maintenance of information on neighboring nodes is a requirement of a number of topology-dependent transmission scheduling solutions. Nodes run a common algorithm for each of the time-slots which produces a permutation of contending two-hop neighbors within a list. The node that arrives at the head of the permutation is permitted to transmit. As the permutation changes from time-slot to time-slot, the various nodes take turns transmitting data frames. It should be appreciated that since the relative order of the nodes in the permutation does not conflict at all nodes, the decision for transmission is assured to be conflict-free. One of the primary advantages of TWMA is the inherent support it provides for broadcasting and multicasting. This support is critical in multi-hop packet-radio networks due to the routing-table updates which must be sent on broadcast mode for efficiency and because multicast applications are becoming extremely popular in the Internet, of which future packet-radio networks are becoming a seamless extension.

2. Protocol Description 2.1. Topology Organization

The topology of the network is abstracted as an undirected graph G=(V,E), where V is a collection of nodes utilizing the TWMA protocol for communication, and E is a set of links between nodes. The network is conceptually organized into rings according to the number of hops which exist from each node to a reference node, typically a central node. It is assumed that each node recognizes, or has been assigned, its particular ring number, and that each node is assigned a unique ID number. Each node is assumed to be mounted with a wireless transceiver that uses a single multi-access broadcasting channel to exchange data frames with neighboring nodes. A link between two nodes indicates that the two nodes can directly communicate with each other via the common channel and are generally referred to as "one-hop" neighbors, since a single transmission hop must be traversed in passing a packet from one neighbor to the other. Two nodes which have a common one-hop neighbor are referred to as two-hop neighbors of each other. An "n-hop" neighborhood comprises a community of neighbors within n-hops of one another, such as in a two-hop neighborhood which comprises neighbors separated by one or two hops.

To utilize the common channel, a single node is designated as the central node in each connected component of the network. The choice of the central node depends on specific needs of the wireless communication application and may be generally selected algorithmically based on topological information about said network, for example as provided by way of a central node selection algorithm (not described). It will be appreciated that the optimal centralized position of said central node within a given portions of a network mesh depends on the anticipated traffic patterns within said network. In commercial applications, the network access point (NAP) is often chosen as the central node for Internet access, while military applications may want to select the command and control node as the central node.

If the shortest distance from a node to the central node is r, it can be said that the node is in ring r. Nodes with the same shortest distance to the central node belong to the same ring. One-hop neighbors in ring r−1 of a node in ring r are called upstream nodes, and those in ring r+1 of a node are referred to as downstream nodes. It is assumed that the routing control protocol under TWMA informs each node of its particular ring number.

2.2. Time Division Multiplexing

In general, TWMA may be considered a distributed topology-dependent TDMA protocol that schedules channel access by time-slots of equal duration. The present description of TWMA does not delve into implementation specifics of synchronizing time to the desired accuracy as many techniques are well known to those of ordinary skill in the art, however, approaches for achieving it are suggested such as by listening to data traffic in the network, and using time signals within the global positioning system (GPS).

FIG. 1 depicts a time-slot as the smallest time unit for transmitting one or more complete data frames within a block 10, comprising a hush section 12, in addition to sections 14, which are further divided into parts 16 within which time-slots 18 exist. To schedule channel access $t_p$ consecutive time-slots 18 are combined into a part 16, with three consecutive parts being combined into a section, and $s_b$ consecutive sections being combined into the largest chunk of time, referred to as block 18. It is preferable, that every node computes its part for transmission. For example, the part number for a node within the exemplified embodiment is calculated by modulo-three evaluation of the ring number of the node. It will be appreciated that a modulo-three calculation is generally performed by dividing the ring number by three and then selecting only the remaining portion of the calculation as the given part number, wherein ring number 6 evaluates to 0, 7 evaluates to 1, 8 evaluates to 2, and 9 evaluates to 0 again, and so forth. It will further be appreciated that the modulo-n choice is selected depending on the number of parts which are defined within each section within said block, and that alternative numbers of sections may be selected by one of ordinary skill without departing from the present invention. It should also be appreciated that other forms of calculation may be utilized to divide the nodes into the respective sections as based on the ring number.

To facilitate network management, one section of each block, such as the last section, is allocated for membership maintenance and is referred to as a hush section 12 because transmissions from any node previously recognized node within the network are disallowed within hush section 12.

New members, however, that have listened but not transmitted within previous sections, can announce their existence during hush section 12.

Figure 2:
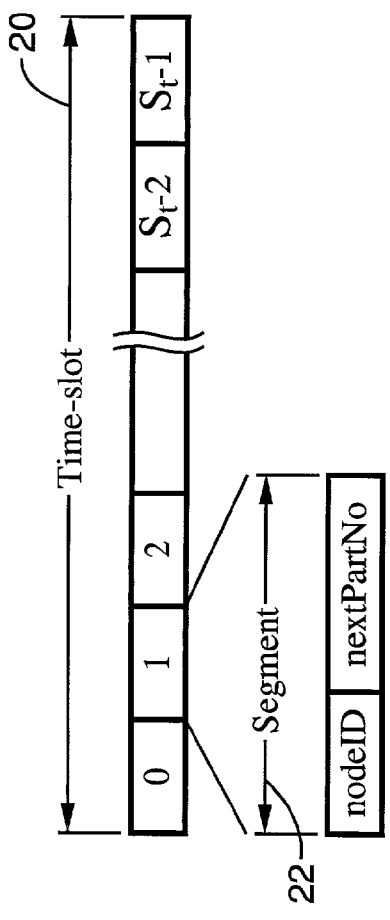
FIG. 2 is a block diagram of time-slot format within the hush section of a TDMA block according to an aspect of the present invention showing entries for node ID and next part number.

FIG. 2 illustrates that time-slots within hush section 12 are preferably further divided into $s_t$ segments 22 of equal duration, wherein each is of sufficient duration to allow a signal to be sent by new members. The information within each segment preferably comprises node information, such as identification (ID), and a next part number.

Figure 3:
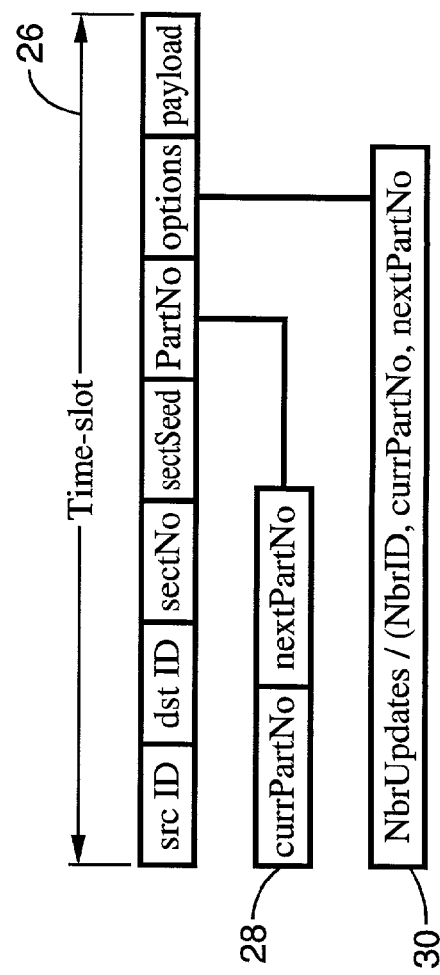
FIG. 3 is a block diagram of time-slot format within a non-hush section of a TDMA block according to an aspect of the present invention showing entries for source ID, destination ID, section number, section seed, part number, options, and payload.

FIG. 3 illustrates a preferred time-slot format 26 for use in non-hushed sections of block 10. Preferably the information within the non-hushed section comprise source identification, destination identification, section number, section seed, part number, options, and payload. The part number field 28 may comprise current part number and next part number, while the options field 30 may comprise number of updates, number ID, current part number, and next part number. It should be appreciated, however, that the fields are described by way of example, and that a person of ordinary skill in the art may alter the composition of the fields without departing from the teachings of the present invention. Comparing FIG. 3 with FIG. 2 the differences in time-slots for hushed and non-hushed sections are readily apparent.

Every node within the network preferably maintain rotary counters such as a current segment number, time-slot number, part number, and a section number within a block, which count from 0 to $s_t$-1, $t_p$-1, 2, $s_b$-1, respectively.

2.3. Channel Access Scheduling

To achieve topology-dependent channel access each node broadcasts the IDs and part numbers of its immediate, one-hop, neighbors to its other one-hop neighbors so that every node can maintain a map of IDs and part numbers for each of its local, two-hop, neighbors. It should be appreciated that a similar procedure could be implemented to extend this so that information is maintained for a given "n-hop" range of local neighbors. This information is retained to facilitate channel access scheduling so that direct interference is avoided by one-hop neighbors and hidden terminal interference by two-hop neighbors.

Each section of the channel is assigned a random number s, called section seed, which preferably originates from a central node. It is advantageous for the section seed to regenerate itself using a common random-number generator with current one as seed. New members synchronize themselves to the section seed upon entering the network by listening to data frames transmitted in the channel and later rely on the random number generator.

Based on the node ID and the section seed, every node preferably computes a message digest md for itself and every two-hop neighbor. Suppose a node has ID, i, and current section seed s, a simple albeit imperfect message digest can be provided according to the logic operation (iXORs). It will be appreciated, however, that a number of alternative algorithms, of arbitrary complexity, may be utilized to generate a message digest. The common channel should be accessed by nodes according to the following additional rules:

Rule 1—Within a given section, a node in ring r transmits in its part p only where p=r mod 3.

Rule 2—Within a given part, a node with message digest md for the current section transmits in time-slot t, where t=md mod$t_p$.

Rule 3—When nodes within two hops are hashed into the same time-slot of the same part in a section for transmission, they are to recognize the situation and resolve the contention by a common random-permutation algorithm applied to the contending neighbors. The algorithm preferably concatenates the message digest of the local node and all contending nodes with their respective ID numbers, and sorts the results in ascending order which corresponds to one random-permutation of these nodes. If a node finds itself at a predetermined position in the resulting list, such a the first entry of the sorted sequence, the node is the winner and is granted use of the time-slot within the current section for transmitting one or more data frames. Otherwise, the node must await the next section which has a different section seed and a different permutation of these nodes.

Therefore, following the three part section, nodes within each ring can receive an opportunity to transmit. Simultaneous transmissions by nodes within different rings do not interfere with each other since they use different parts and those using the same part in difference rings are interleaved by two levels of rings. The organization of nodes into rings and the ordering of node transmissions by part number are substantially responsible for use of the term "time wave multiple access" (TWMA) to describe the scheduling protocol, as data packets directed downstream from the central node can be considered similar to ripples propagating from the central node.

It should also be appreciated, that the priority of transmission by a node is dependent on local topologies. In contrast to other MAC protocols, which resolve contentions whenever a node requires channel access, TWMA computes the priority of accessing the channel at each node based on node mapping information which can be obtained by listening to one-hop neighbor updates within data frames as transmitted by one-hop neighbors. It will be appreciated that mapping generally comprises the broadcasting of node information, such as node ID and part number, by each node to neighboring nodes located within one hop, and the registration of information contained in broadcasts from neighboring nodes into a map of those local neighbors.

Figure 5:
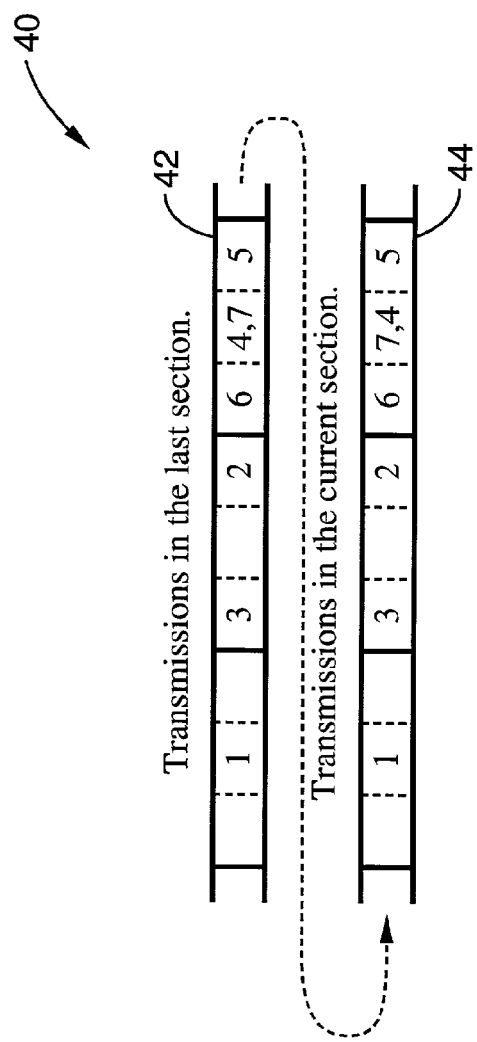
FIG. 5 is a block diagram of a packet transmission within a block according to an aspect of the present invention, showing transmissions per section.
Figure 4:
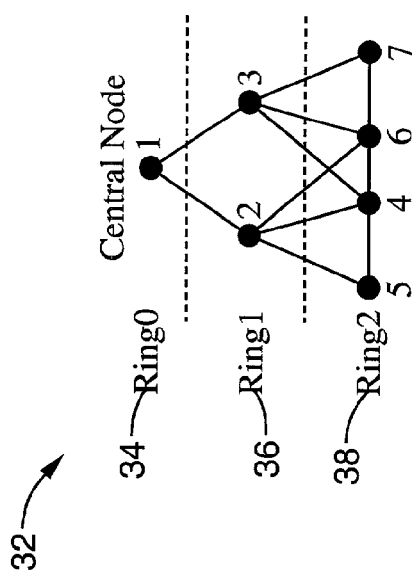
FIG. 4 is a graph of network topology within an ad hoc network according to an aspect of the present invention shown as a simple example incorporating three rings.

FIG. 4 depicts a sample network topology 32 and FIG. 5 illustrates a corresponding channel scheduling. The example network of FIG. 4 is shown comprising three rings 34, 36, 38, shown with a variable number of interconnected numbered nodes per ring. The time-slot assignment is assumed to remain constant from section to section so as to show the permutation effects. From FIG. 5 it can be seen that node 4 and node 7 are two-hop neighbors which are contending for time-slot 1 in part 2 of every section. The random-permutation of node 4 and 7 changes from section to section so that each one statistically receives an equal opportunity to transmit.

2.4. Chain Ordering

A node transmits data frames only if the computation according to Rule 3 indicates that it is the first node in the sequence. Unless the node is the first node, however, it can not arrive at conclusions about which node is at the first position because the vision of two-hop neighbors is different from node to node. It is possible that a node found in the first rank of the sequence at other nodes finds itself in other rank of the sequence locally. As a result of this phenomenon from node to node, only the node contending for the time-slot with global highest priority wins. This priority is referred to as chain ordering, and it has a quasi-global effect. This scenario occurs infrequently but it helps to clarify the operation of TWMA and the utilization of the time division channel.

2.5. Transmission Rate

As previously mentioned, the pattern of channel access is generally analogous to ripples spreading from the central node, since the ring number of a node decides the part for transmissions. One result of the channel access pattern is that data packets generally flow two times faster when traveling away from the central node to downstream nodes, than those packets which are traveling towards the central node.

When data packet flows are directed away from the central node along the shortest path, the data packet goes through nodes with ring number 0, 1, 2, 3, 4, 5, . . . consecutively, which should transmit at part 0, 1, 2, 0, 1, 2, . . . respectively. Since 0, 1, 2, 0, 1, 2, . . . is the order of time, the data packet could be transmitted successively from ring to ring downstream without interruption. Considering data packets moving towards the central node, it will be appreciated that they traverse nodes with ring number . . . 5, 4, 3, 2, 1, 0 consecutively, transmitting at part . . . 2, 1, 0, 2, 1, 0. To obtain such a pattern from, time division, data packets are relayed at parts within brackets: . . . 0, 1, (2), 0, (1), 2, (0), 1, (2), 0, (1) 2, (0).

The characteristic transmission rate of the approach is particularly well suited to current Internet traffic patterns in which the amount of downlink traffic generally exceeds the uplink traffic. Furthermore, it should be appreciated that the ring-like organization of the network nodes provide each ring a fixed amount (one third) of the time available for transmission which further favors central node oriented data communications.

2.6. Predictable Channel Utilization

It should be appreciated that since channel access scheduling in TWMA is totally based on computation, it is a simple matter for a node to predict the intervals between its successive transmissions and the portion of a block used by that node. Depending on the types of traffic going through a node, the node can readily schedule in advance the transmission of each type of traffic by executing TWMA many steps ahead. A block is the unit utilized for network management under a mobile network environment and is thereby the boundary of these predictions.

3. Mobility Management

The description to this point has assumed a static network topology in which each node knows the shortest distance to the central node and all two-hop neighbors. In mobile networks the network topology changes frequently as a result of node movements in relation to one another and the central node. Achieving collision-free transmission in a mobile network requires nodes to maintain a current map of their neighborhood with respective distance changes, and to reharmonize themselves with local and global scheduling because scheduling is highly dependent on the two-hop neighborhood and distance to the central node. In addition, the network should seamlessly incorporate new links or nodes into the topology with minimum impact on the channel access scheduling.

3.1. Interfacing with Routing Protocols

TWMA relies on upper-layer routing protocols to provide the distance information because a limited amount of topology information, such as the two-hop neighborhood, is available in the MAC layer for channel access scheduling. It will be appreciated that the ring number relates to global topology and a request to the routing module should return a ring number, subject to support by upper-layer routing protocols recognizing a central node, otherwise an invalid ring number is returned, such as "−1". It is preferable that TWMA select a random part for transmission if a valid ring number is not available. Although having a correct ring number can aid in maximizing channel utilization it is not required for providing collision-free channel access insofar as the node maintains up-to-date two-hop neighbor IDs and their corresponding part numbers. Achievement of exact scheduling according to the new ring number without interfering with current scheduling, therefore relies on node retention of the current part until the termination of the current block while it is simultaneously broadcasting its part number for the subsequent block in a predetermined portion of the data frame, such as in a four-bit field within the header. Using two bits to indicate part number, a four bit field provides for indicating a part number for the current block and the next block. One-hop neighbors recognize changes in the network and broadcast updates, such as in a data frame option field as shown in FIG. 3. Each update, as indicated, includes an ID number, current part number, and the next part number.

As a result of a node transmitting collision-free in the current block, each of its one-hop neighbors are apprised of the intended part number for the next block. If a node is not given the opportunity to broadcast its changes within the current block, then it will wait until a subsequent block to transmit a collision-free packet. In considering that every node theoretically receives a substantially equivalent opportunity to transmit, the probability of a node being prevented from transmitting is negligible.

The delegation of ring number to the upper routing protocols simplifies the TWMA protocol while enhancing flexibility. The selection of the central node and the distance to the central node, which is not necessarily the shortest, are totally under the control of the routing protocol. Determination by a node of its part may be preferably performed by simply truncating the ring number to a modulo three value.

3.2. Joining a Network

The TWMA protocol utilizes the hush section of the channel for adding new members into the network. To allow new members to join the network topology, all nodes already in the topology hush for the last section of a block, during which new members are allowed to announce their existence. Prior to joining, a new member first listens to the network traffic for at least a complete block before it attempts to participate in the network topology. The duration of a block, given as $s_b$ sections, is derived to yield a high probability that every node in the network can transmit at least once during the block. In the present embodiment, this probability was selected at greater than 99%. Data frames received within a whole block provide information about the one-hop neighbors of a new member, while the new member synchronizes its time-slot and section-seed values with the other nodes of the network. The section-seed is preferably included in the header of each data frame as shown in FIG. 3. If a new member is unable to detect any neighbors, it assumes a time division according to its own clock.

In the hush section of the block, a new member selects a random part number and hashes itself into a time-slot of that part using the common algorithm described in Rule 2. The new member also chooses a random segment within the time-slot to transmit its signal, which contains only node ID number and its part number as exemplified in FIG. 2. The one-hop neighbors of the new member receive the signal from the new member and thereby incorporate the new member within their one-hop neighbor set.

It will be appreciated that collisions may occur when multiple new members within a two-hop distance attempt to notify the network using the exact same part, time-slot, and segment within the hush section as other new members. The avoidance of collisions requires that two-hop neighbors of the new member recognize its existence. Therefore, a requirement of the protocol is that new members refrain from transmitting in the block following a notification transmission and listen to updates transmitted by its one-hop neighbors to assure that its joining request has been received correctly. If certain neighbors do not acknowledge the status of the new member in the next block, the new member attempts to transmit other signals in the following hush section until it receives acknowledgments from all of its one-hop neighbors. It will also be appreciated that the new member and its one-hop neighbors need to exchange their one-hop neighbor information utilizing some form of conventional or custom one-hop neighbor synchronization protocol, the implementation of which is not described herein. Pursuant to synchronization, the new member is eligible for transmission within the topology of the network. Under conditions of moderate network density and infrequent member additions, the protocol assures incorporating a new member into the network within a finite time because the randomness of TWMA assures that the same collision does not persist from block to block.

3.3. Neighborhood-Changes

The TWMA protocol is responsive to both new members and new links within the network. As two nodes, a and b, are established as one-hop neighbors, they must recognize one another and synchronize their one-hop neighbor information. The recognition of node b by node a is considered in two cases.

1. a receives complete data frame from b:
   A neighbor update is sent out by node a in its next data frame regarding the status of node b. Unless node b sends back a neighbor update about node a, node a sends out a signal in the hush section in similar manner to a new member and await acknowledgment from node b. The process is repeated until node b recognizes node a that results from node a and node b exchanging complete one-hop neighbor information.

2. a does not receive complete data from b, but detects noise:
   A persistent high-level of noise (collisions) is detected in some time-slots by node a, and it therefore does not receive complete information from node b. In response, node a sends out a signal in the following hush section in like manner to a new member. While collisions continue to occur, node a continues to send signals during the hush section, until node a is recognized by b, at which time b follows the process described in the previous case.

In the second case above, high-level noise may also be the result of two one-hop neighbors of node a that are unaware of the existence of one another. Conflicts may be resolved by node a sending out updates about one-hop neighbors in the colliding part to resolve the conflicts.

It should be appreciated that the disappearance of a one-hop neighbor or a link can be detected by a node when neither the data frame nor a signal is received from the neighbor for a given number of blocks. The disappearance of a one-hop neighbor is preferably indicated within the present embodiment by setting the part number of the neighbor to three in a neighbor update. If different neighbors report different part numbers for a node, the receiver of the update believes all valid part numbers of the node, which implies allocation of multiple time-slots to the node, while obsolete part numbers of the node are eliminated by aging.

3.4. Network Initialization

Prior to stabilization of a network that is being initialized, or brought up, not every node is aware of its position or ring number within the network topology. Therefore, each such node randomly selects a part number to join the network for channel access. Unless a new member node is isolated it receives the data frames transmitted by existing member nodes within the network topology, these frame contain current section number and section seed, for polling new members. In an extreme network initialization situation, wherein the entire network awakens simultaneously, channel access scheduling is established ring by ring extending from the central node.

Upon stabilization of the network routing and the obtaining of correct distance information, the TWMA routing protocol at each node receives the ring number and the new part number for use in subsequent blocks.

4. Correctness of TWMA

A number of theorems are subsequently described which assume a static network such as exemplified by a stable network topology wherein each node possesses up-to-date two-hop neighborhood information.

Theorem 1: TWMA is collision free and each message is received without collision at all one-hop neighbors.

Proof: Following Rule 1, nodes in different rings having different part numbers and do not interfere with each other. According to Rule 2, nodes in the same part are hashed into different time-slots of the part so that contentions by nodes within the same part are minimized.

Rule 3 applies to decide transmission priorities as contention arises between nodes that are within two hops sharing the same part which may be assigned into the same time-slot. A node with a local minimum among its two-hop neighborhood is authorized to transmit without conflicts from its contending nodes because every contending node runs the same random-permutation algorithm, and yields transmission privilege to the node with higher priority. No conflicts, or ties, can exist because the priority is a combination of the resulting message digest and ID number, which is unique within the network.

It will be appreciated, therefore, that TWMA allows only one node to access the channel within its two-hop neighborhood thereby avoiding both collisions as a result of either direct or hidden terminal interference. It should also be appreciated that TWMA provides the capability for collision-free broadcasting.

Theorem 2: TWMA is equitable and provides each node with an equal opportunity to transmit in a given time section.

Proof: According to Rule 1 a part is selected within each ring to transmit within each section, therefore, TWMA provides unbiased treatment of nodes within each ring. In accord with Rule 2, a hashing function uniformly assigns a node into one time-slot within a part for transmission. In general, the number of nodes allocated into any given time-slot is equal, and not a single node is favored in its time-slot allocation. In the event that certain time-slots are allocated with more nodes than others, in the majority of circumstances these time-slots will be evenly populated because the time-slot allocations change randomly from section to section. Therefore, TWMA is unbiased within regard to time-slot allocation of nodes within a given ring.

Rule 3 provides for determining precedence using a random permutation algorithm in which each node is conferred an equal probability of becoming the local minimum as a result of use of message digests comprising node ID and section seed within the randomizing algorithm. The section seed is generated randomly for each section which assures that the resulting permutation is totally random. Therefore, TWMA provides equitable time-slot access to all contending parties within the ring.

Theorem 3: TWMA is live, wherein at least one node is capable of transmitting in each time-slot if nodes are assigned into the time-slot at all.

Proof: Organization of the network into at least three rings assures that at least one ring is always active in each part for transmission. Nodes are always eligible to transmit in that time-slot unless the hashing function has not assigned any nodes within a specific time-slot.

If a node has no contenders for the given time-slot then it may transmit unhindered. If time-slot contentions arise, the random algorithm described as per Rule 3 computes deterministically and unanimously the order of nodes for each node even though the view of nodes at each node is limited with two-hop neighbors. Overall, there might exist multiple local minima which are authorized to transmit. The worst case occurs when a node never becomes the local minimum and therefore only the global minimum is able to transmit for the time-slot as previously described under chain ordering.

5. Performance

TWMA is a synchronized and fully distributed-scheduling algorithm for providing time division multiple access to a single channel using randomized permutation. In contrast to other MAC protocols using unpredictable impromptu RTS/CTS handshakes for contention resolutions, TWMA computes the priority of each node in advance for the duration of a whole section. As a result of the synchronism and randomness afforded by the protocol it has been shown to be collision-free while providing equitable channel access. Under the assumption of a synchronized and stable network, the protocol can be accurately simulated so that anticipated performance may be evaluated.

The following description simulates TWMA in an abstract way in which time units are based on number of time-slots instead of concrete time metrics, and longitudinal units utilized for establishing network locations are based purely on numbers, that is, the network topology is randomly generated by placing 100 nodes within an area of 1000× 1000. Node 0 is designated as the central node and placed at the center (500, 500) of the area, and the topology of the network is computed by assuming a given transceiver transmission range as mounted within each node. The simulation assumes that any two nodes within the transmission range of each other can exchange data frames and maintain a network link therebetween.

Different connectivities and topologies within the network may be produced by controlling the transmission range of each of these nodes. Based on the topology determined by a specific transmission range, a node is given its ring number and part number and the mapping for its two-hop neighborhood. The TWMA protocol is executed for 100,000 sections to evaluate its performance and several statistics can be provided which reveal the effects of different transmission powers on topology diameter which is preferably expressed as a maximum ring number, along with contention statistics for transmission and transmission/reception rates. In the simulation, the size $s_b$ of each block is considered generally inconsequential and therefore is not considered, however, each part is configured with $t_p=5$ time-slots.

Figure 6:
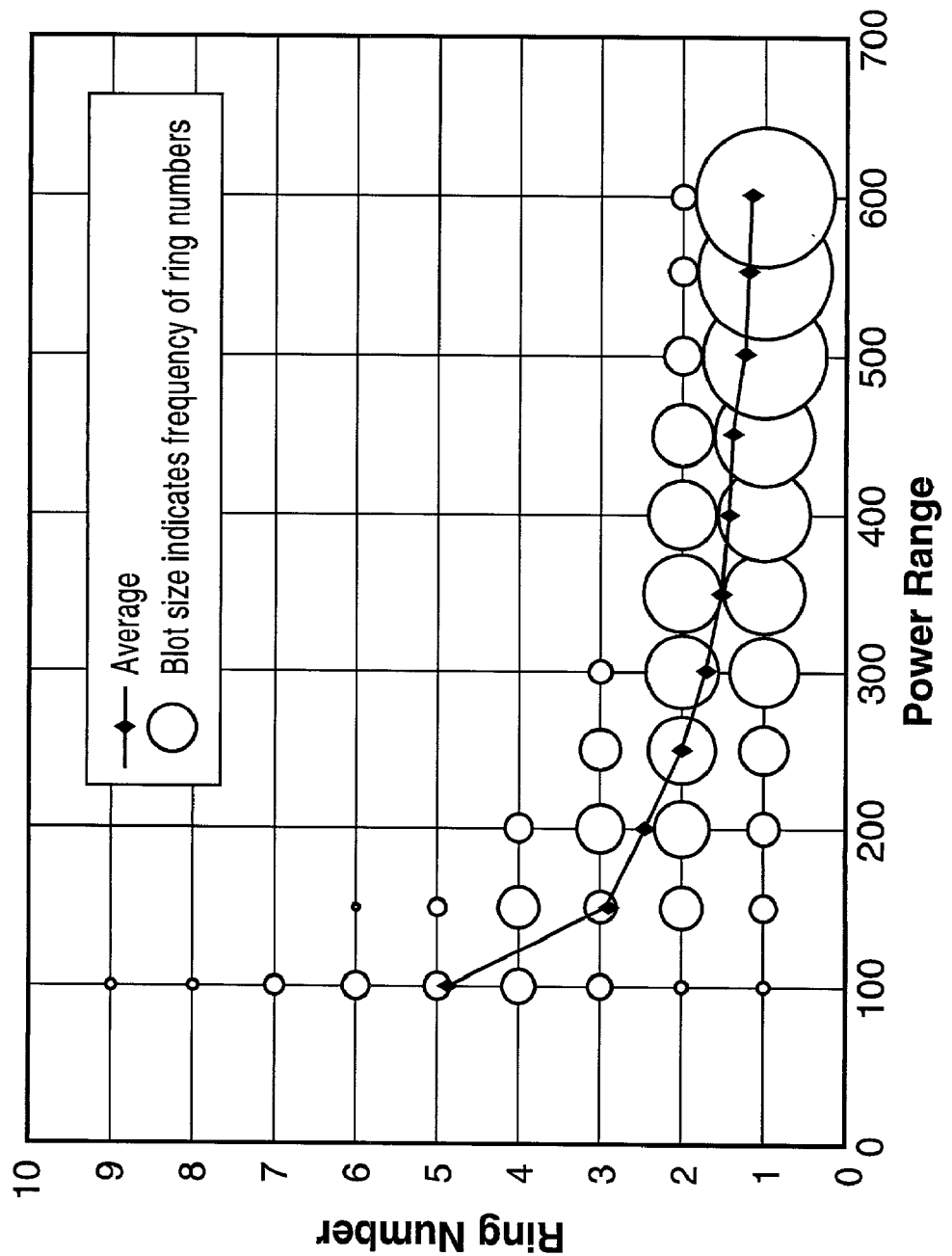
FIG. 6 is a graph of transmission power at different ring numbers according to an embodiment of the present invention, showing a relationship between increasing transmission power and a decreasing number of rings.
Figure 7:
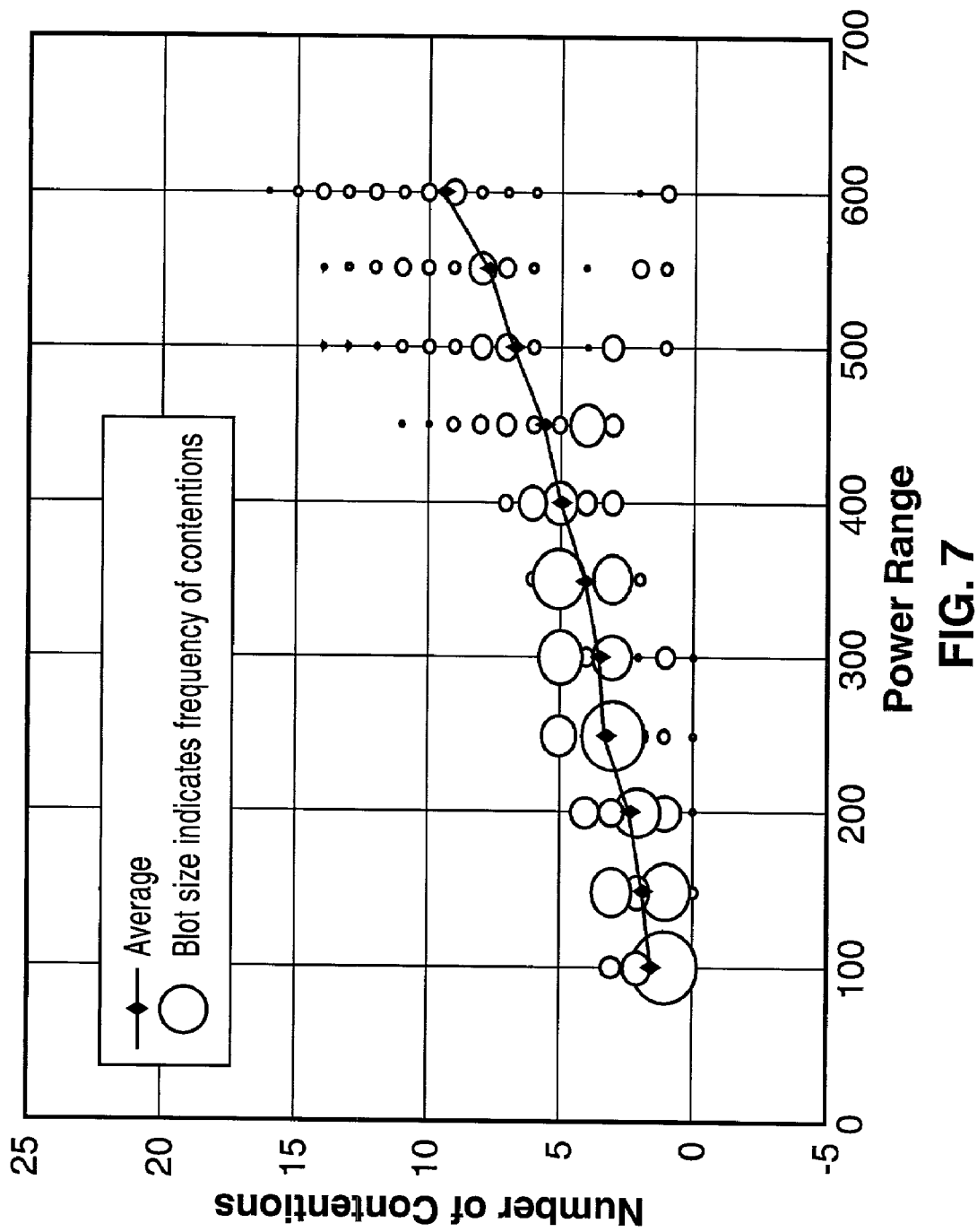
FIG. 7 is a graph of contention levels in response to transmission power levels according to an embodiment of the present invention, showing the growth rate of contentions with increasing transmission range.
Figure 8:
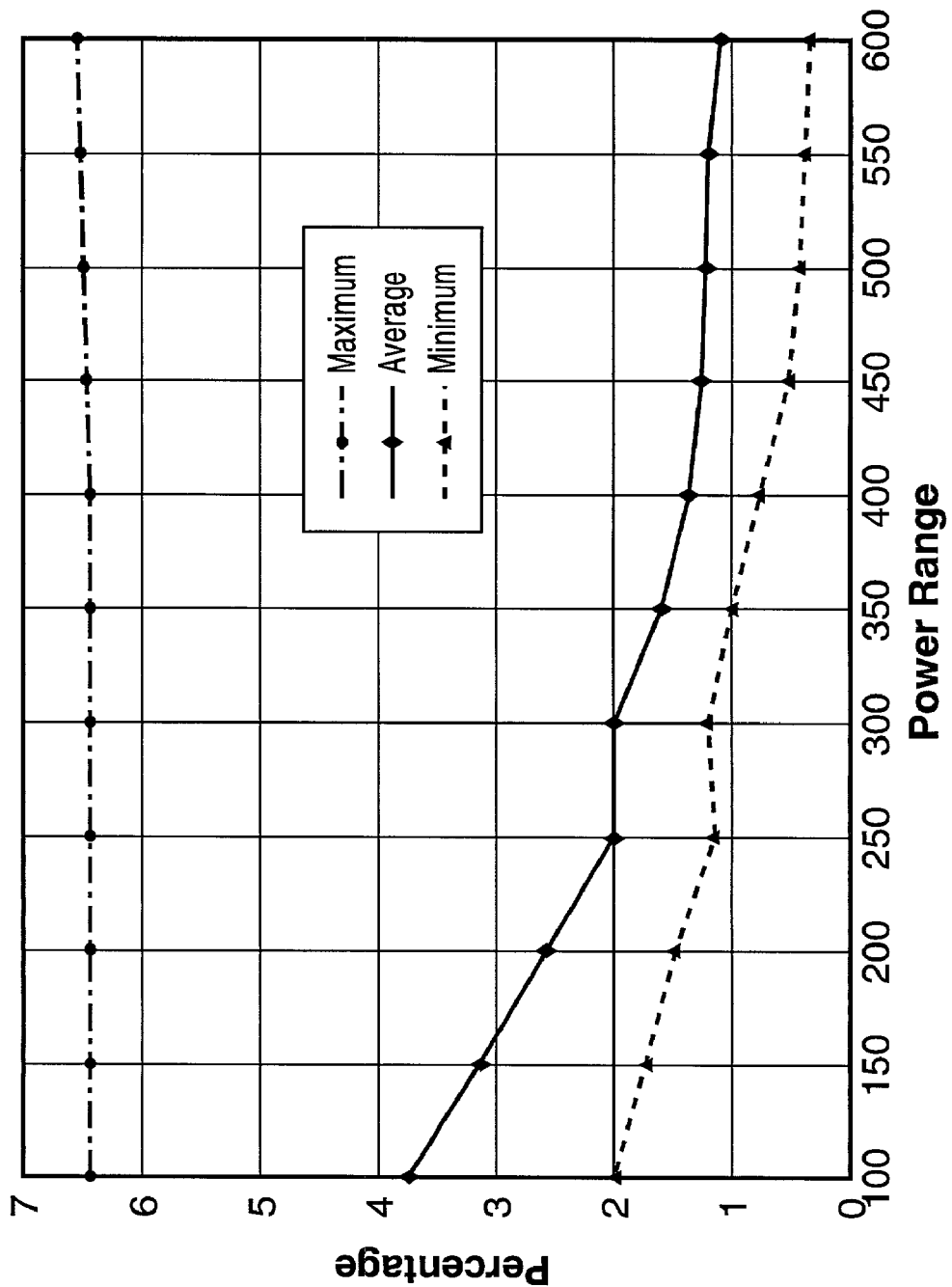
FIG. 8 is a graph of transmission time in response to the number of contending nodes according to an embodiment of the present invention, showing an inverse relationship between the number of contending nodes and the percentage availability of transmission time.
Figure 9:
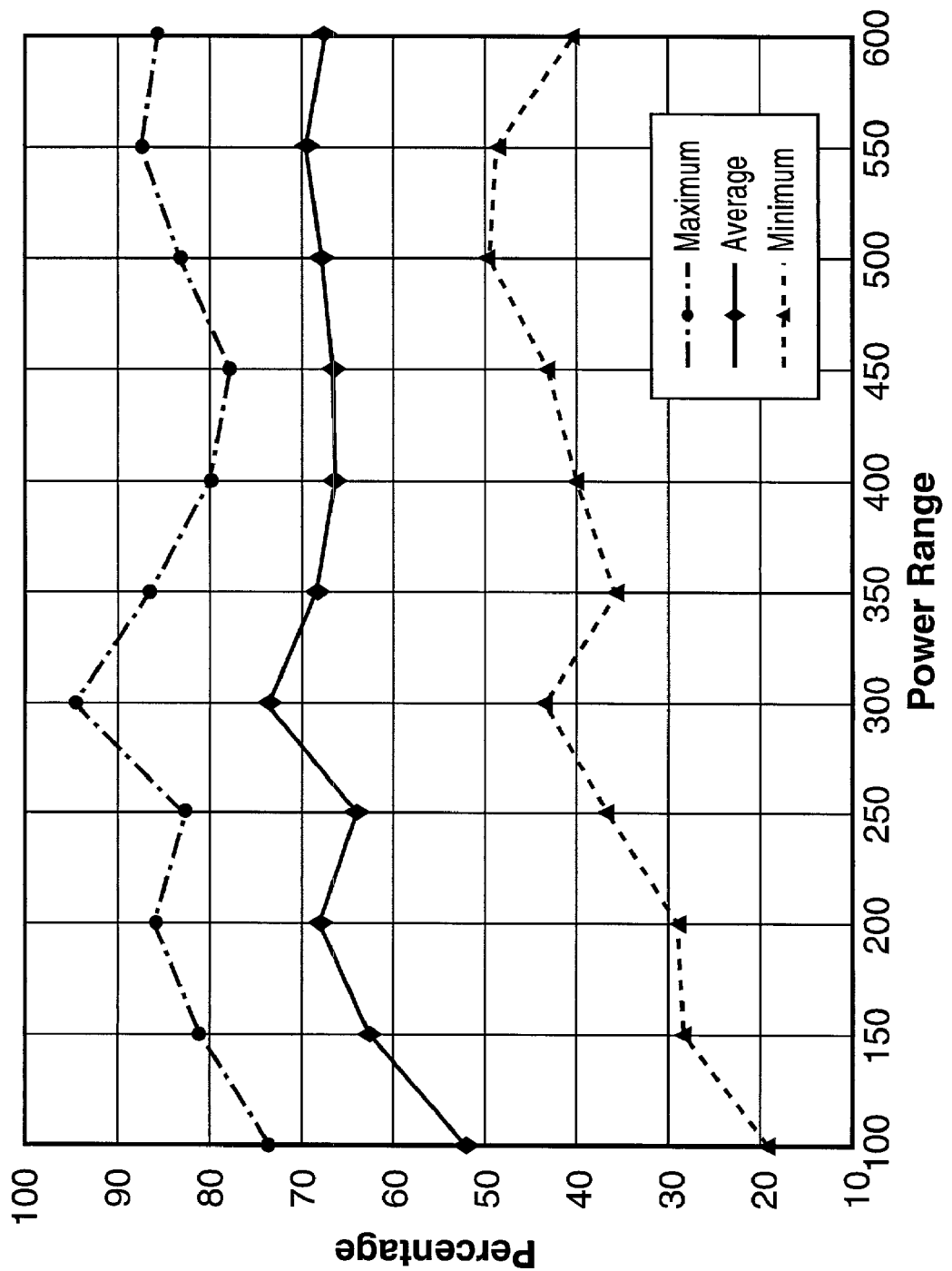
FIG. 9 is a graph of transmission time in response to the number of contending nodes according to an embodiment of the present invention, showing that nodes usually receive the data packets.

FIG. 6 illustrates the distribution of ring numbers within the simulation as the number of nodes within different rings at different power ranges. As transmission power range increases, the network can be covered by fewer rings. FIG. 7 illustrates average contention in response to the power range. Drawing information from the graph, for example, a node that was found to have two other contending nodes, on average, at a transmission range of 100 quickly escalated to having fourteen contending nodes, on average, as the transmission range increased to 600. FIG. 8 illustrates the average time percentage that each node has available for transmission which is approximately inversely proportional to the average number of contending nodes. It will be appreciated, however, from the graph of FIG. 9 that nodes are generally provided with a high data frame transmission availability.

Figure 10:
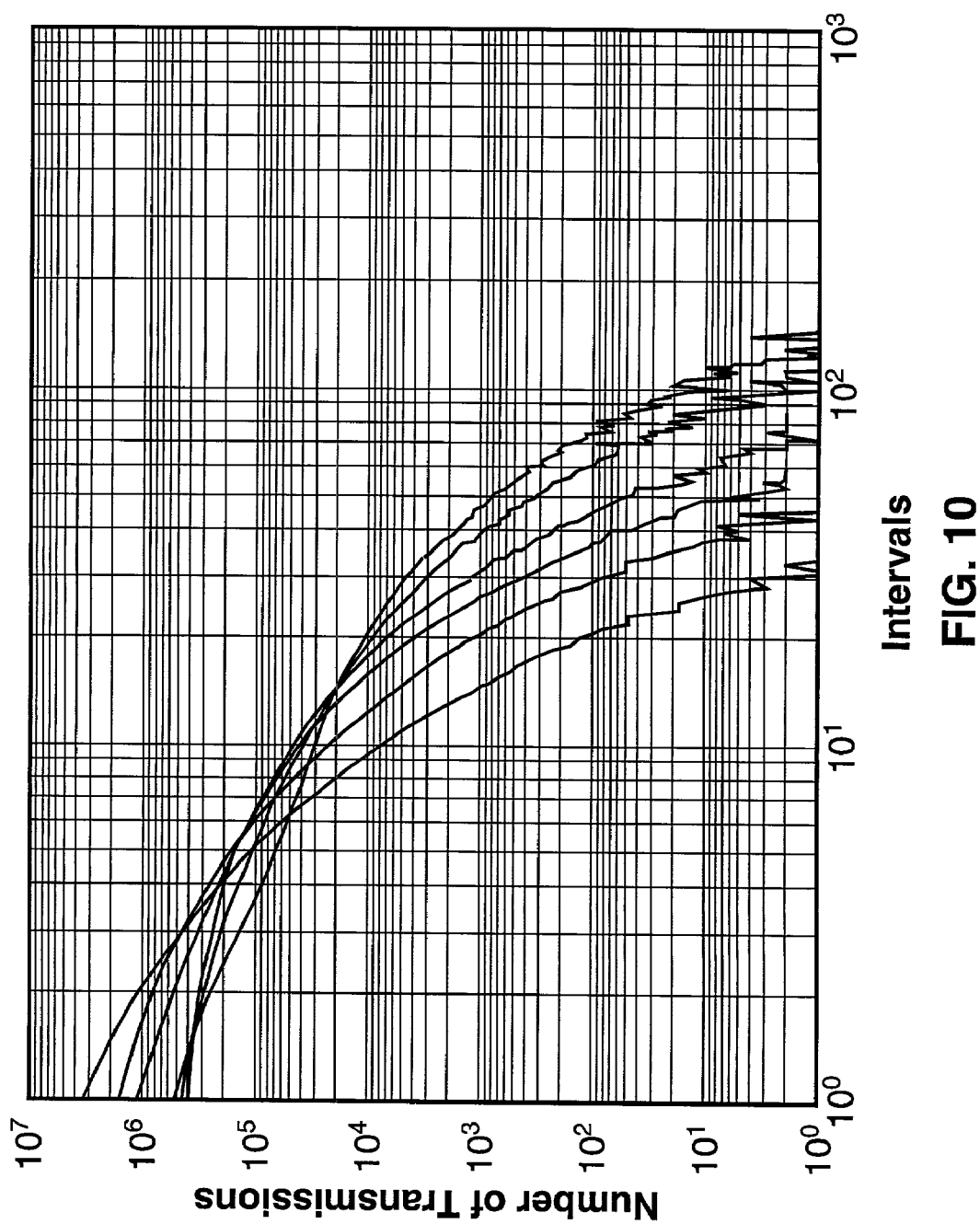
FIG. 10 is a graph of the interval between successive transmissions according to an embodiment of the present invention, showing the relationship between transmission intervals and number of transmissions.

In view of the randomness provided by TWMA, the histogram of intervals measured in section units are examined between successive transmissions by a given node. FIG. 10 illustrates that nodes generally transmit in consecutive sections, and that the number of successive transmissions with long intervals is drastically reduced as the interval is prolonged. However, it should be appreciated that successive transmissions having very long intervals should occur rarely within a real-world network. Long intervals between successive transmissions are of general concern within Internet applications, and suggestions for improvement are subsequently described.

6. Performance Improvements 6.1. Empty Time-Slots

During network operation under TWMA, there typically exists time-slots that remain unallocated to any node, as illustrated within FIG. 4. These time-slots may be utilized by nodes within the same part that otherwise would not be eligible for their use in accord with their respective message digest. However, multiple nodes within a given part may contend for one of the spare time-slots. Therefore, the efficiency of channel utilization may be improved by adding the following rule which provides a mechanism for nodes which are competing within the same part to utilize the otherwise unallocated time-slots as controlled by the same random-permutation algorithm described as per Rule 3.

Rule 4—A node competes for spare time-slots in its part by running a similar random permutation algorithm on two-hop neighbors that transmit in that part. The only difference between this permutation is that the message digest is based on neighbor ID, and section seed along with the spare time-slot number.

Figure 11:
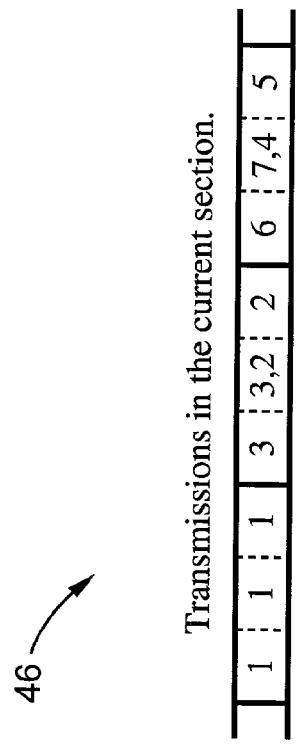
FIG. 11 is a block diagram of time-slots within a current section of the block in which spare time-slots are competed for by nodes according to an aspect of the present invention.

According to Rule 4, central node 1 will utilize all time-slots of part 0 for transmissions, while node 2 and 3 compete for time-slot 1 in part 1, and no spare time-slot exists for competition in part 2 as shown by section 46 of FIG. 11. It will be appreciated that the central node is favored in this situation and it is provided with more transmission opportunities as are often necessary in a number of network applications.

6.2. Transmission with Collision

Collision-free transmissions are a principle objective of TWMA, however, it will be appreciated that in order to eliminate the undesirably long intervals between successive transmissions, as depicted in FIG. 10, transmissions can be allowed subject to a predetermined low collision probability level. To improve the quality of communication, such that the intervals between successive transmissions are bounded, a section within a block may be utilized for transmission of packets subject to a non-zero probability of collision. The present embodiment utilizes the second to the last section of a block, named a blind section, for transmissions that are subject to the possibility of collision. Any node that did not transmit during previous sections of the block may transmit in the blind section without the necessity of computing transmission priorities. Transmissions within this section may be referred to as blind transmissions as no look-ahead is performed within the protocol to prevent collision. It should be noted that a node is cognizant of its own transmission history but not the transmission history of the other nodes within the network, such that priorities within the blind section may not be computed to determine which node should be given transmission access. The block size is preferably sufficiently large to allow most nodes to transmit in previous sections, wherein transmissions within the blind section should be sparse so as to limit the probability of collisions.

Given a block size and a geographically uniformly distributed network topology, the transmission probability analysis is related with the average number of contending nodes. Instead of analyzing the problem in a circumstance where each node holds a fragment of the network topology, the topology has been abstracted into a topology that is fully connected, providing a complete graph in which the number of nodes in the graph is the average number of contentions. An analogy to the problem can be drawn from an easy to visualize problem involving obtaining a number of balls from a bin. This ball analogy can be stated as:

Assume "n" distinct balls exist in a given bin. A ball is grabbed at random, and then put back into the bin for the next grab. This ball-grabbing process is repeated k times. It can then be considered how many ways exist for exactly j balls to never be grabbed.

The value of k finds correspondence with block size within TWMA. The number of ways in which specific balls 1, 2, ..., i are untouched in k grabs is $(n-i)^k$. In addition, the number of ways that these balls are untouched in the grab with exactly j distinct balls not grabbed ($j \geq i$) is represented by:

$$U_j \frac{C(n-i, j-i)}{C(n, j)} = U_j j! \frac{(n-i)!}{n!(j-1)!} \quad (1)$$

in which $C(m,n)$ denotes the number of combinations of m members from a group of n elements. Let $j=i, i+1, i+2, \ldots, n-3, n-2, n-1$, we have:

$$(n-i)^k = U_i i! \frac{(n-i)}{n!0!} + U_{i+1}(i+1)! \frac{(n-i)}{n!1!} + \quad (2)$$
$$U_{i+2}(i+2)! \frac{(n-i)}{n!2!} + \ldots + U_{n-3}(n-3)! \frac{(n-i)}{n!(n-3-i)!} +$$
$$U_{n-2}(n-2)! \frac{(n-i)}{n!(n-2-i)!} + U_{n-1}(n-1)! \frac{(n-i)}{n!(n-1-i)!}$$

In addition, let $i=0, 1, 2, \ldots n-1$, we have:

$$U_0 + U_1 + U_2 + U_3 + \ldots + U_{n-3} + U_{n-2} + U_{n-1} = n^k \quad (3)$$

$$U_1 1! \frac{(n-1)}{n!0!} + U_2 2! \frac{(n-1)}{n!1!} +$$
$$U_3 3! \frac{(n-1)}{n!2!} + \ldots + U_{n-3}(n-3)! \frac{(n-1)}{n!(n-4)!} +$$
$$U_{n-2}(n-2)! \frac{(n-1)!}{n!(n-3)!} + U_{n-1}(n-1)! \frac{(n-1)!}{n!(n-2)!} = (n-1)^k$$

$$U_2 2! \frac{(n-1)}{n!1!} + U_3 3! \frac{(n-1)}{n!2!} + \ldots + U_{n-3}(n-3)! \frac{(n-2)}{n!(n-5)!} +$$
$$U_{n-2}(n-2)! \frac{(n-2)!}{n!(n-4)!} + U_{n-1}(n-1)! \frac{(n-2)!}{n!(n-3)!} = (n-2)^k$$

-continued
$$U_3 3! \frac{(n-3)}{n!0!} + \ldots + U_{n-3}(n-3)! \frac{(n-3)}{n!(n-6)!} +$$
$$U_{n-2}(n-2)! \frac{(n-3)!}{n!(n-5)!} +$$
$$U_{n-1}(n-1)! \frac{(n-3)!}{n!(n-4)!} = (n-3)^k \ldots = \ldots$$
$$U_{n-3}(n-3)! \frac{3!}{n!0!} + U_{n-2}(n-2)! \frac{3!}{n!1!} + U_{n-1}(n-1)! \frac{3!}{n!2!} = 3^k$$
$$U_{n-2}(n-2)! \frac{2!}{n!0!} + U_{n-1}(n-1)! \frac{2!}{n!1!} = 2^k$$
$$U_{n-1}(n-1)! \frac{1!}{n!0!} = 1^k$$

Computing $U_j$ as $j=n-1, n-2, \ldots, 1, 0$; it will be appreciated that the number of ways that exactly j balls remain untouched in k grabs is given by:

$$U_j = K_j \cdot C(n, j) \quad (4)$$

where $$K_{n-1} = i^k - \sum_{t=1}^{i-1} K_{n-1+t} \cdot C(i, t),$$

and $K_{n-1}=1$. Similar problems have been described by researchers in the industry, and the following provides explicit results for $U_j$:

$$U_j = \binom{n}{j} \sum_{t=0}^{n-j} (-1)^t \binom{n-j}{t} (n-j-t)^k \quad (5)$$

Figure 12:
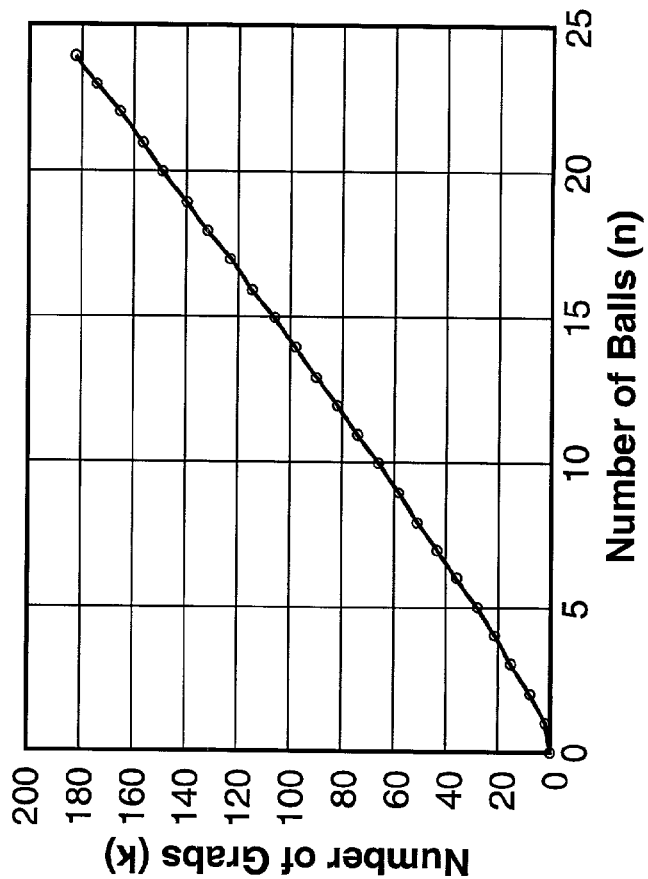
FIG. 12 is a graph of a ball-grabbing model which is an analogy of the time-slot allocation problem, showing the minimum number of grabs for a given number of balls.
Figure 13:
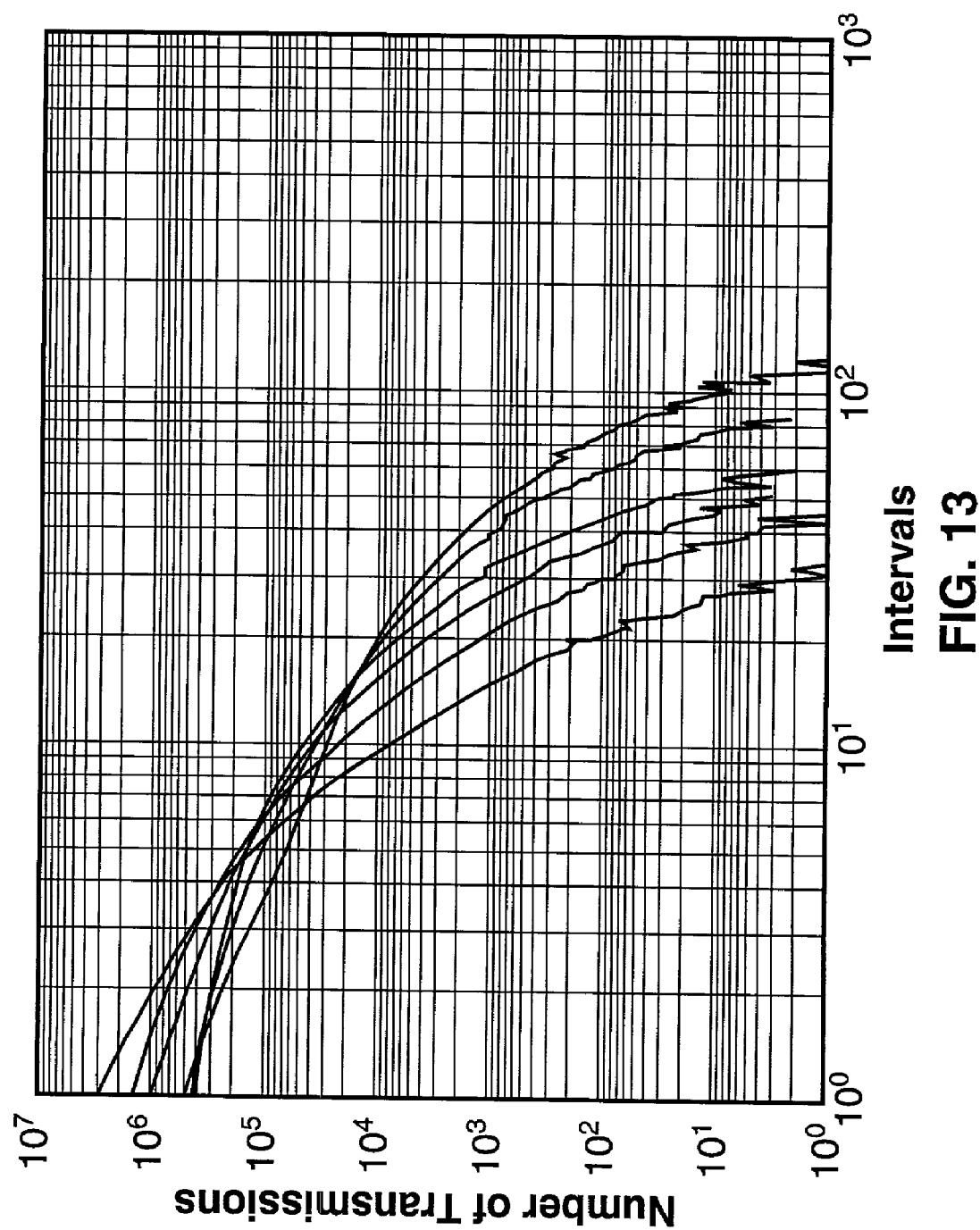
FIG. 13 is a graph of the interval between successive transmissions according to an aspect of the present invention, showing an improvement in interval transmission as a result of incorporating blind section transmissions.
Figure 14:
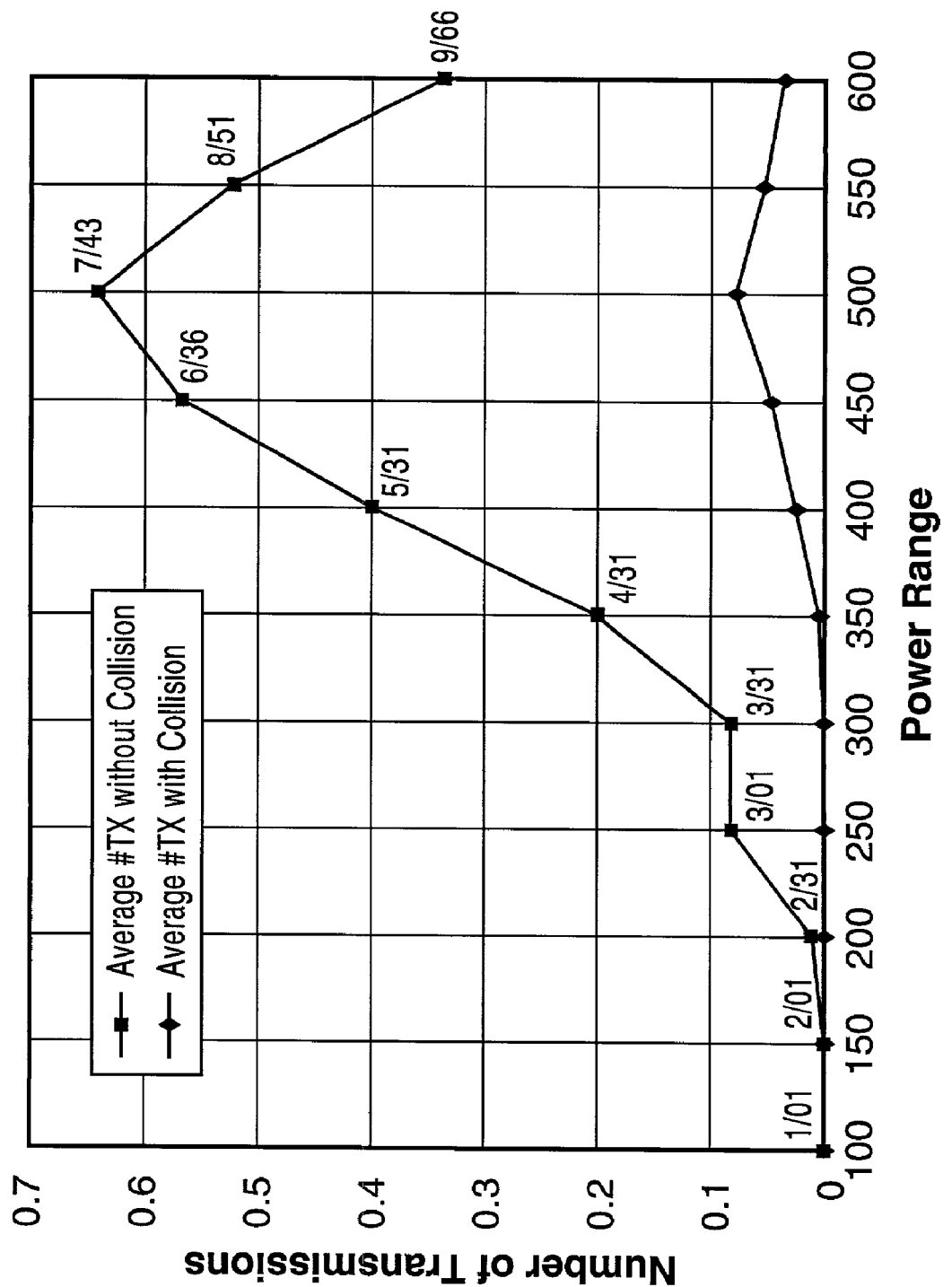
FIG. 14 is a graph of the number of transmissions in relation to transmission power, showing the number of transmissions that occur with and without collisions.

The embodiment of the present invention attempts to find a value for k such that $$\frac{U_0}{n^k}$$

is high, such as greater than a 99% probability of gaining access to transmit, wherein almost every node has the opportunity to transmit. Attempts were also made to let $$\frac{U_1}{n^k - U_0 - U_1}$$

be determined by a constant wherein non-zero probability of having a collision-free transmission exists. FIG. 12 represents the minimum number of grabs as a function of number of balls such that the probability of all balls getting grabbed is greater than 99%. Considering the results from the simulations and the average number of contentions according to the network topology the block size is derived which allows for transmissions with a sufficiently low possibility of collisions. It should be recognized that the simple mathematical model above does not fully describe multi-hop networks, however, it should provide a close approximation of an actual network. In the simulations, the block size is subject to a lower bound and an upper bound so as to minimize collisions as far as possible while reserving most of the bandwidth for collision-free transmission. Block size boundary within the simulation of the exemplified embodiment was set at thirty one (31) and ninety seven (97) respectively. It will be appreciated that the block size will be designated within a real-world application. FIG. 13 illustrates the interval improvement of the network when a non-zero probability of collision is allowed within a selected segment of the data packet traffic. FIG. 14 depicts a comparison between the number of transmission which can occur with and without collisions. Represented within the figure is the "average number of contentions/block size" at each transmission range. Note that block sizes are computed before simulations and the average number of contentions is collected at the end of simulations. Parameters such as block size can be selected at run-time by a single authority, such as the central node, to which the complete topology information of the network is available.

6.3. Multiple Central Nodes

The use of multiple central nodes within a network is generally dependent on the routing protocols of the upper layers. The TWMA method can be operated with a number of routing protocols so long as a ring number can be provided so that a part number may be obtained for any given node. If every node maintains up-to-date two-hop neighborhood information then TWMA can provide for collision-free channel access.

6.4. Bandwidth Allocation

Since it is a computation-based channel access scheduling algorithm, TWMA benefits from additional network management capabilities. For example, by adding another field in the header of a MAC data frame, TWMA allows each node to dynamically demand bandwidth in that field. Variations in bandwidth demands are preferably handled similarly to part number changes as previously described.

In TWMA, bandwidth which is denoted as bw, is allocated by time-slots. The demanded bandwidth can either be obtained from different time-slots or from the same time-slot that the node is using. In the first scheme, a node is considered as bw number of different members, each one having an ID of the original node ID combined with a number from 0 to bw-1, and is assigned a time-slot for transmission. Whenever a member wins a slot for transmission, the original node wins to transmit. In the second scheme, time-slot assignment is solely decided by node ID, but different combinations of node ID and a number from 0 to bw-1 are all considered contending members of the time-slot in the permutation algorithm. Whenever a contending member wins, its original node wins to transmit, thereby changing the portion of a time-slot that the node uses for transmissions.

It should be appreciated that as a result of contentions for time-slots, the bandwidth demand can not be exactly satisfied with the exact amount of time-slots. The requesting node needs to compute the number of time-slots required to meet bandwidth demands.

7. Conclusion

TWMA provides a beneficial topology-dependent TDMA scheduling protocol that provides collision-free data transmissions without impromptu handshakes or contention phases to allow channel accesses and time-slot reservations. Contentions for a time-slot are resolved by a synchronized random-permutation-algorithm that produces priority of each node for transmissions. The method according to the simulations and theorem proofs has been shown to provide equitable access for transmission and liveliness according to the randomness and topology dependency of the algorithm. TWMA in addition is capable of operating effectively when subject to mobility with special sections in time divisions. The basic TWMA scheduling protocol described may be easily adapted to specific applications, and/or extended due to its computation-oriented nature.

Accordingly, it will be seen that this invention provides a MAC scheduling protocol for a network which allows selected traffic to be handled collision-free. The scheduling protocol is capable of efficiently utilizing the bandwidth of the channel while providing equitable transmission access. It should be appreciated that the present invention has been exemplified within a specific embodiment in which, however, the invention may be implemented with a number of variations as would be obvious to one of ordinary skill in the art. In particular, the numbering and hierarchy of structures within the present invention, such as the use of three part numbers, is substantially a matter of design as will be obvious to one of ordinary skill.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of scheduling collision-free topology-dependent time division multiple access (TDMA) data transmission on a channel having time-slots within a given block of an ad hoc network having a plurality of nodes, comprising:
   mapping time-slots of local neighbors;
   computing a random permutation of contending local neighbors; and
   transmitting one or more data frames within a given time-slot by a node selected according to said random permutation
   wherein each of said nodes is located on a specific ring within the topology of said network, as determined by the number of hops to reach a given reference node; and
   wherein each of said nodes is assigned a unique node ID;
   wherein said reference node is a central node which communicates a ring number and assigns a node ID to each of said nodes;

wherein the choice of said central node is dependent on the specific needs of the communication application; and wherein said central node may be algorithmically selected based on topological information about said network.

2. A method as recited in claim 1, wherein said local neighbors comprise neighbors which are located within a two-hop neighborhood.

3. A method as recited in claim 1, wherein a sequence of said time-slots is organized into a part, or equivalent.

4. A method as recited in claim 3, wherein each node is associated with a given part number within which it may be allowed to transmit.

5. A method as recited in claim 4, wherein said mapping of time-slots for local neighbors comprises:

broadcasting said node ID and said part number by each of said nodes to neighboring nodes located within one hop; and registering information from said broadcasts from neighboring nodes into a map of local neighbors.

6. A method as recited in claim 5, wherein a node that does not gain transmission access for broadcasting said node ID and said part number information to neighboring nodes may wait until the transmission can be performed collision-free in a subsequent block.

7. A method as recited in claim 4, wherein said part number is derived from said ring number.

8. A method as recited in claim 7, wherein the value of said part number p for a given node is determined by modulo three evaluation of said ring number r for said node, as given by $p = r \bmod 3$.

9. A method as recited in claim 7, wherein said nodes within said network are allowed to transmit collision-free data frames during their part number within a section of said block.

10. A method as recited in claim 3, wherein a sequence of said parts is organized into a section within which each node can vie for transmission of data frames within their respective part number.

11. A method as recited in claim 10, wherein a random section seed number is assigned to each said section.

12. A method as recited in claim 11, wherein said random section seed number is originally issued by said central node.

13. A method as recited in claim 12, wherein said random section seed number regenerates itself using a random-number generator.

14. A method as recited in claim 11, further comprising determining a message digest for one of said nodes based on the node ID for said node and said random section seed number for the current said section.

15. A method as recited in claim 14, wherein said message digest comprises the computation (iXORs) wherein i represents the node ID, and s represents said random section seed.

16. A method as recited in claim 14, wherein said message digest md determines the time-slot t which may be allocated to one of said nodes.

17. A method as recited in claim 16, wherein said time-slot is determined by way of hashing.

18. A method as recited in claim 17, wherein said time-slot is determined by hashing said message digest md according to the relationship $t = md \bmod t_p$, which determines the time-slot within said part within which transmission may be allowed.

19. A method as recited in claim 18, wherein neighboring nodes may contend with one another for the same time-slot in response to being hashed to the same time-slot according to said message digest.

20. A method as recited in claim 19, wherein said computation of a random permutation of contending neighbors comprises:

concatenating said message digest with said node ID for each node as determined by said map of local neighbors to generate a set of results; and sorting said results to select a node for transmission within said time-slot according to said random permutation.

21. A method as recited in claim 10, wherein each said section may be subject to different time-slot allocation rules.

22. A method as recited in claim 21, wherein each of said time-slots is formatted into segments whose composition is responsive to said time-slot allocation rules.

23. A method as recited in claim 10, wherein a sequence of said sections is organized into a block.

24. A method as recited in claim 23, further comprising maintaining rotary counters within each of said nodes for segment, time-slot, part number, and section number within said block.

25. A method as recited in claim 23, wherein at least one said section of said block comprises a hush section for introducing new member nodes into said network.

26. A method as recited in claim 25, wherein a node may join said network as a new member node subject to communicating their existence to neighboring nodes.

27. A method as recited in claim 26, wherein said hush section comprises a plurality of time-slots in which said new members announce their existence to the network.

28. A method as recited in claim 27, wherein said time-slots within said hush section are divided into segments of sufficient duration to allow a signal to be broadcast by said new members of said network.

29. A method as recited in claim 28, wherein a new local neighbor synchronizes itself with said section seed by listening to data frames transmitted within said time-slots of said block.

30. A method for resolving time-slot contentions between nodes contending for a single communication channel within an ad hoc time division multiple access network, comprising:

assigning a node ID to each of said nodes within said network;

creating a message digest, or equivalent, based on said node ID and a random seed value for each of said nodes;

concatenating said message digest with node ID, for all of said nodes in contention, into a contention list;

sorting said contention list according to a random-permutation algorithm; and granting access to a node at a predetermined position within said sorted list.

31. A method as recited in claim 30, wherein said predetermined position comprises the top of said list.

32. A method for topology-dependent access scheduling which allows a node on a network to access a time-slot within a given block of a communication channel to transmit, comprising:

dividing said block into sections of contiguous parts that each contain a series of time-slots;

establishing a ring number for each of said nodes on said network according to its topological distance from a central node;

mapping a unique node ID for each of said nodes within said network;

calculating a part number for each of said nodes based on said ring number;

establishing a section seed for each of said sections of contiguous parts within said block;

calculating message digests for all neighboring nodes;

determining if contention exists for a given time-slot as based on said message digests;

resolving any said contention by executing a random-permutation algorithm of said message digests to select a winning node to transmit in said time-slot; and transmitting one or more data packets during said part number in said time-slot.

33. A method as recited in claim 32, wherein the non-winning nodes may attempt to gain access to said time-slot in subsequent sections of said block.

34. A method as recited in claim 32, wherein one of said nodes in a ring r is only authorized to transmit when the part number within said section of said block matches the part number p determined for said node.

35. A method as recited in claim 32, wherein said part number is determined for one of said nodes according to the relation p≡r mod3, where p is the part number, and r is the ring number as determined by the topological distance to a central node.

36. A method as recited in claim 32, wherein within said part number a node with said message digest md for the current section is allowed to transmit in time-slot t, only where t≡md mod$t_p$.

37. A method as recited in claim 32, wherein spare, otherwise unallocated, time-slots may be utilized by nodes within a given part that otherwise would not be entitled to use said time-slot according to their message digest.

38. A method as recited in claim 37, further comprising resolving contention for said spare, otherwise unallocated, time-slots;

wherein two or more of said nodes compete for a given spare time-slot within their respective part numbers;

calculating a spare slot message digest which incorporates the spare slot number;

resolving said contention by executing a random-permutation algorithm; and awarding said spare time-slot to a winner of the random-permutation according to position within the list of results.

39. A method as recited in claim 32, further comprising:

setting aside a blind section within said sections of said block for use with blind transmissions; and wherein a node unable to gain access to a collision-free time-slot may attempt transmission during said blind section without computing transmission priorities.

40. A method for resolving contentions for time division multiple access to a single communication channel, comprising:

assuming a synchronized function generating random-permutation of contending parties for collision-freedom, which implies knowledge of two-hop neighbors in a network topology by each node in the network;

wherein the permutation corresponds to an array of sorted message digests of all contending parties;

wherein each message digest comprises a fingerprint of each contending party identification (ID) and a seed, plus the contending party ID;

wherein the seed is synchronized at all parties and regenerates itself by a common random function from time to time so that the message digest of each party varies every time to assure the randomness of the permutation;

wherein once a party finds itself at the first position of the sorted sequence, the party is authorized to access the common channel; and wherein for others that find themselves at other positions, they remain quiet for the time slot.

* * * * *